United States Patent [19]

Schmidt et al.

[11] 4,303,477
[45] Dec. 1, 1981

[54] PROCESS FOR THE PYROLYSIS OF WASTE MATERIALS

[75] Inventors: Rudiger Schmidt; Franz Steininger, both of Munich, Fed. Rep. of Germany

[73] Assignee: Babcock Krauss-Maffei Industrieanlagen GmbH, Munich, Fed. Rep. of Germany

[21] Appl. No.: 157,260

[22] Filed: Jun. 9, 1980

[30] Foreign Application Priority Data

Jun. 25, 1979 [DE] Fed. Rep. of Germany ....... 2925620
Dec. 20, 1979 [DE] Fed. Rep. of Germany ....... 2951478

[51] Int. Cl.$^3$ ................. C10B 47/30; C10B 57/06; C10B 57/14; C10B 57/18
[52] U.S. Cl. .................................... 201/2.5; 106/109; 110/246; 110/342; 201/17; 201/20; 201/25; 201/33; 423/230
[58] Field of Search .............. 201/2.5, 17, 20, 25, 201/33; 110/218, 219, 245, 342, 343; 423/230, 240, 244 A; 106/109, 110

[56] References Cited

U.S. PATENT DOCUMENTS

| | | | |
|---|---|---|---|
| 3,625,164 | 12/1971 | Spector | 110/342 |
| 3,823,676 | 7/1974 | Cook et al. | 423/206 T |
| 3,859,933 | 1/1975 | von Klenck | 110/219 X |
| 3,888,193 | 6/1975 | Kishigami et al. | 110/245 |
| 3,933,127 | 1/1976 | Arps | 110/343 X |
| 4,026,679 | 5/1977 | Collin | 110/342 X |
| 4,049,462 | 9/1977 | Cocozza | 106/110 X |
| 4,111,755 | 9/1978 | Ban et al. | 110/342 X |
| 4,175,211 | 11/1979 | Chen et al. | 201/2.5 X |
| 4,201,751 | 5/1980 | Holter et al. | 423/230 X |
| 4,206,186 | 6/1980 | Holter et al. | 201/2.5 X |

FOREIGN PATENT DOCUMENTS

2752915 5/1979 Fed. Rep. of Germany ...... 110/245
47-19678 9/1972 Japan ................................. 110/219

*Primary Examiner*—Frank W. Lutter
*Assistant Examiner*—Roger F. Phillips
*Attorney, Agent, or Firm*—C. O. Marshall, Jr.

[57] ABSTRACT

The emission of halogens and sulfur dioxide and the formation of water-soluble compounds of heavy metals are suppressed in the pyrolysis of waste in a carbonization zone at a temperature in the range from 300° to 600° C. by adding a fine-grained basic material to the waste prior to completion of the pyrolysis of the waste in the carbonization zone.

16 Claims, 5 Drawing Figures

PROCESS FOR THE PYROLYSIS OF WASTE MATERIALS

BACKGROUND OF THE INVENTION

This invention relates to a process for the pyrolysis of waste materials having halogen-containing, sulphur-containing and/or heavy-metal-containing constituents, the waste materials being subjected to carbonization in a low-temperature carbonization zone at temperature in the range from 300° to 600° C.

The pyrolysis of waste materials having halogen-containing constituents (for example waste materials containing PVC and/or fluorine-containing polymers) is accompanied by the formation of hydrohalic acids (HF, HCl) which cause considerable problems in regard to gas and effluent purification and which necessitate the use of expensive materials for the construction of the low-temperature carbonization zone and the following gas purification line. In the pyrolysis of sulphur-containing waste materials, the presence of $H_2S$ and $SO_2$ in the pyrolysis gas gives rise to similar problems.

In this connection, it has to be borne in mind that, under laws governing the incineration of refuse, insofar as it involves the emission of chlorine, fluorine and $SO_2$ for example, the inorganic chlorine compounds (expressed as $Cl^-$), fluorine compounds (expressed as $F^-$) and $SO_2$ in the exhaust gas of installations with a waste throughput of more than 0.75 t/h should not exceed levels of 100 mg/Nm$^3$, 5 mg/Nm$^3$ and 80 mg/Nm$^3$, respectively. The maintenance of these levels involves heavy equipment cost for the gas and effluent purification of the pyrolysis gases formed during the pyrolysis of waste materials having halogen-containing, sulphur-containing and/or heavy-metal-containing consituents.

SUMMARY OF THE INVENTION

Accordingly, the object of the present invention is to provide a process for the pyrolysis of waste materials of the type in question which is distinguished by considerably reduced cost of gas and effluent purification, which in addition—in the pyrolysis of domestic, commercial and industrial refuse—basically enables a gas wash to be dispensed with altogether in maintaining required pollutant levels, and which, finally, makes it possible to use relatively inexpensive materials for those parts of the installation which come into contact with the pyrolysis gas.

According to the invention, this object is achieved in that fine-grained basic materials are added to the waste before and/or during the low-temperature carbonization process.

These fine-grained basic materials (in particular lime hydrate, limestone, dolomite, magnesium carbonate and calcium oxide) absorb the acid pollutants formed during the low-temperature carbonization process (in particular the hydrohalic acids HF and HCl and the sulphur compounds $H_2O$ and $SO_2$) to a very large extent, the salts formed being calcium chloride ($CaCl_2$), calcium fluoride ($CaF_2$), calcium sulphide ($CaS$) and calcium sulphite ($CaSO_3$), which are discharged as solids with the low-temperature coke.

The fine-grained basic materials are best added in an over-stoichiometric ratio, based on the halogen or sulphur content of the waste materials. As tests on which the invention is based have shown, this reduces the acid constituents discharged in the pyrolysis gas by at least one power of ten.

The conditions prevailing in the low-temperature carbonization zone have proved to be particularly favourable for the substantially quantitative absorption of the acid gases formed during the low-temperature carbonization process by the fine-grained basic materials added. Continuous recirculation of the low-temperature carbonization material provides for intimate, constantly renewed and relatively long-lasting contact between the gaseous hydrohalic acids and sulphur-containing acids formed during the thermal decomposition of the waste materials and the fine-grained basic materials.

By the addition of fine-grained basic materials in accordance with the invention, the proportion of acid constituents in the pyrolysis gases can be reduced to such an extent that there is no longer any need for a gas wash to maintain the required pollutant levels. This applies in particular to commercial and industrial refuse which, by virtue of the small content of proteins, does not require a gas wash to eliminate ammonia released during the low-temperature carbonization process. Even in the case of domestic, commercial and industrial refuse having a very high content of PVC and/or fluorine-containing polymers, as well as plastics waste, oil sludges, old oils, old tires, etc., the pyrolysis gases formed during the process of the present invention may be stored and burned or directly burned without a preliminary gas wash.

Another major advantage of the process according to the invention lies in the considerably reduced dust content of the pyrolysis gases. The reason for this lies in the change of the grain form of the low-temperature coke particles brought about by the addition of the fine-grained basic materials. The addition of the fine-grained basic materials during the low-temperature carbonization process results in the formation of more compact low-temperature coke particles having a relatively high specific gravity. Accordingly, these particles separate more easily from the pyrolysis gas during discharge from the low-temperature carbonization zone.

In addition, by reducing the output of pollutants, the process according to the invention makes possible the use of considerably less expensive materials for all those parts of the installation which come into contact with the pyrolysis gas, by virtue of the reduced danger of corrosion.

In addition, a further positive effect is obtained when the fine-grained basic materials are added in a slightly over-stoichiometric ratio. The recirculation of the materials in the low-temperature carbonization zone provides for thorough mixing of the waste materials with the basic materials added in dry form. At the same time, the low-temperature coke attains pH-values of from 7 to 9.5, by far the majority of the heavy metals being present in compounds which are not leached from the dumped low-temperature coke by percolating water.

The quantity in which the basic materials are added in the process according to the invention is essentially determined by the following considerations: the higher the proportion of basic materials added, the lower the output of HCl-, HF- and sulphur-containing pollutants in the pyrolysis gas. For economical reasons, however, it is generally not advisable to bind virtually all the pollutants. In general, it is sufficient to add basic materials to the particular waste being treated in such a quantity that the pollutant levels referred to above are maintained.

In one advantageous embodiment of the process according to the invention, a further quantity of fine-grained basic materials is added to the pyrolysis gases withdrawn from the low-temperature carbonization zone before they enter a dust separator. Thus, approximately 60 to 95% and preferably 75 to 85% of the total input of fine-grained basic materials may be added to the waste before and/or during the low-temperature carbonization process and the remainder may be added to the pyrolysis gases withdrawn from the low-temperature carbonization zone. This procedure promotes the binding of the acid pollutant constituents by contact—prolonged in time and space—with the fine-grained basic materials.

In view of the frequently varying content of halogen-containing, sulphur-containing and/or heavy-metal-containing constituents in the waste materials, it is also advantageous in accordance with the invention to add most of the fine-grained basic materials to the waste before it enters the low-temperature carbonization zone and, during the low-temperature carbonization process, to add only a further partial amount of fine-grained basic materials sufficient to keep the pollutant content constant. This partial amount is best pneumatically introduced into the low-temperature carbonization zone by means of an inert gas, preferably nitrogen stack gas or steam. When an indirectly heated rotary tubular furnace is used as the low-temperature carbonization zone, this partial quantity of fine-grained basic materials added during the low-temperature carbonization process may be blown into the revolving tubular furnace from both ends thereof.

The residence time of the waste materials in the low-temperature carbonization zone is generally from 20 minutes to 90 minutes and preferably from 30 minutes to 60 minutes. The peripheral speed of a revolving tubular furnace forming the low-temperature carbonization zone may be between 3 and 50 m/min. and preferably is between 5 and 30 m/min. In selecting the peripheral speed, it has to be borne in mind that, on the one hand, any increase in the peripheral speed promotes the binding of the acid pollutants during the low-temperature carbonization process by the fine-grained basic materials whereas, on the other hand, the furnace length required for obtaining the necessary residence time increases with the peripheral speed.

It is also favourable to the required thorough mixing of the waste with the fine-grained basic materials added thereto if a revolving tubular furnace forming the low-temperature carbonization zone is provided with lifter-like fittings, preferably over its entire length.

The fine-grained basic materials preferably have a grain size on addition of less than 1 mm.

DESCRIPTION OF THE PREFERRED EMBODIMENTS

Figure 1:
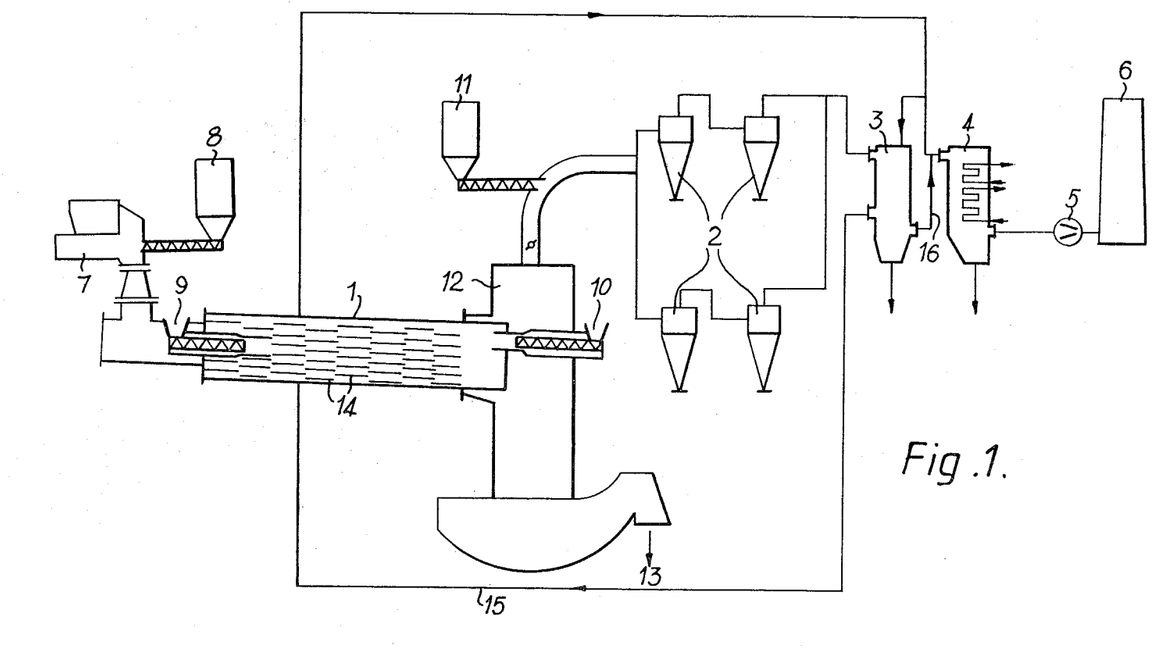
FIGS. 1 to 5 of the drawings diagrammatically illustrate five examples of installations for carrying out the process according to the invention.

The installation shown in FIG. 1 essentially comprises a revolving tubular furnace 1 forming the low-temperature carbonization zone, a dust extractor 2 formed by four cyclones, a combustion chamber 3, a heat exchanger 4, an induced draft fan 5 and a chimney 6.

The waste materials are introduced by a feeder 7. The fine-grained basic materials are introduced by feeders 8, 9, 10 and 11. Most of the fine-grained basic materials are added to the waste through the feeder 8 before the low-temperature carbonization step. The feeders 9 and 10 introduce a further partial amount of the fine-grained basic materials pneumatically into the revolving tubular furnace 1 from both ends thereof. The feeder 11 introduces a further partial amount of fine-grained basic materials—using a mechanical distributor—into the pyrolysis gas which flows from the discharge housing 12 of the revolving tubular furnace 1 to the dust extractor 2. Solid particles may be separated from the pyrolysis gas both in the dust extractor and in the discharge housing 12. The low-temperature coke is removed at 13. The revolving tubular furnace 1 is provided with lifter-like fittings 14.

In the installation shown in FIG. 1, the pyrolysis gases, freed from entrained dust in the dust extractor 2, and the pyrolysis condensates contained therein are burned in the combustion chamber 3 to form stack gases. The stack gases 15 are used for indirectly heating the revolving tubular furnace 1 forming the low-temperature carbonization zone, and are then delivered either to the heat exchanger 4 or at least partly to the combustion chamber 3 in order to enable the combustion temperature of the pyrolysis gases to be controlled by the addition of these cooled stack gases without having to increase the supply of air. Another portion 16 of the stack gases is directly delivered to the heat exchanger 4. The heat exchanger 4 may be formed for example by a steam-generating boiler. The stack gases are removed by the induced draft fan 5 through the chimney 6.

Figure 2:
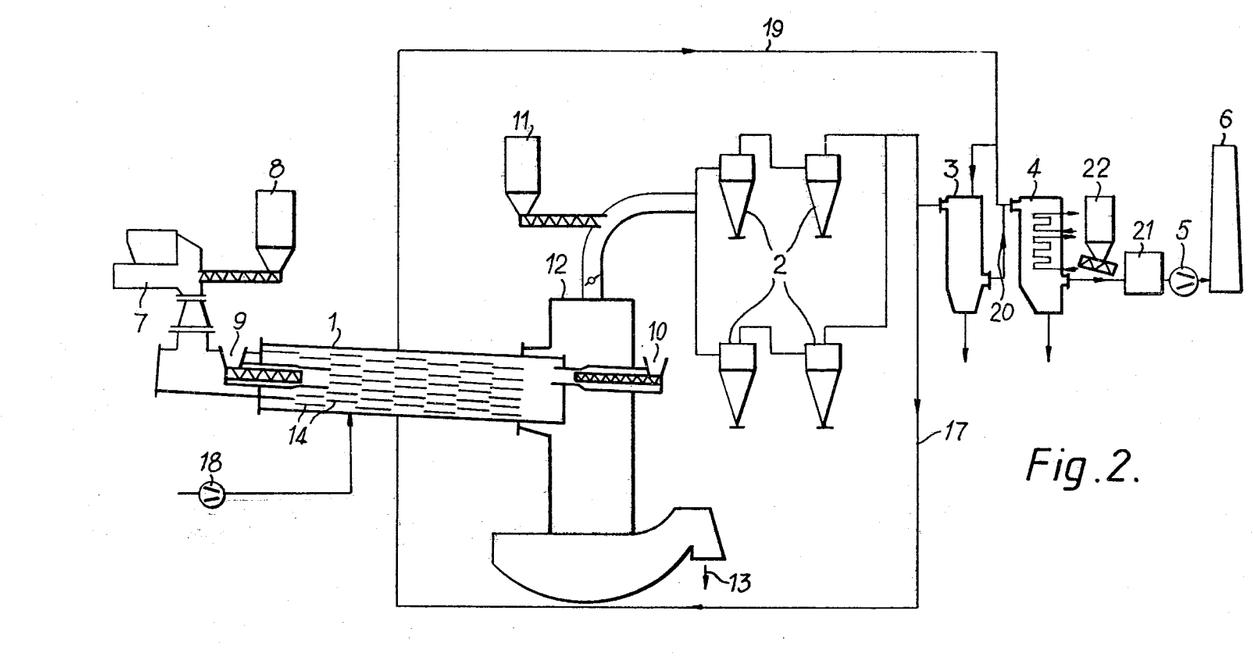

The installation shown in FIG. 2 is only described insofar as it differs from the installation shown in FIG. 1. In this case, a portion 17 of the pyrolysis gases coming from the dust extractor 2 is used for indirectly heating the revolving tubular furnace 1, to which the fresh air required for burning the pyrolysis gases is delivered via a fan 18. The exhaust gases 19 thus formed are delivered to the heat exchanger 4, to which the stack gases 20 issuing from the combustion chamber 3 are additionally delivered.

Before entering a filter 21, the stack gases issuing from the heat exchanger 4 are subjected to a dry stack-gas sorption process in which basic material, such as lime, is introduced by a feeder 22 into the stream of stack gases.

Figure 3:
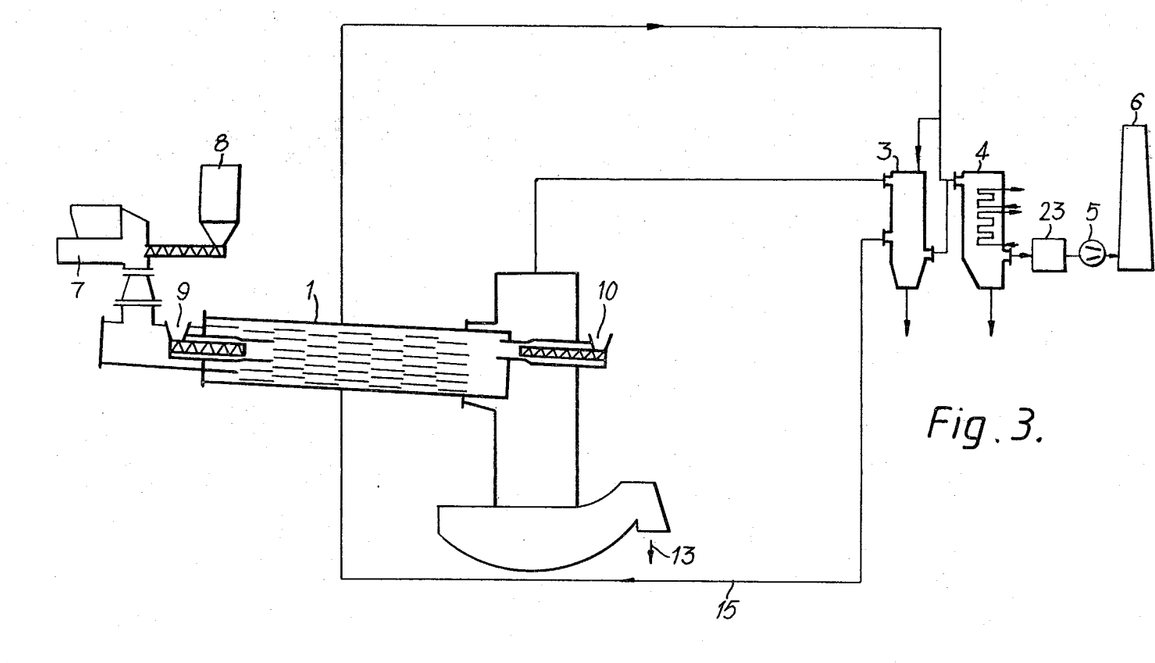

In the installation shown in FIG. 3, fine-grained basic materials are added solely through the feeder 8 (before the low-temperature carbonization step) and through the feeders 9 and 10 (during the low-temperature carbonization step). In this case, the pyrolysis gases are delivered directly, without intermediate dust extraction, from the low-temperature carbonization zone (revolving tubular furnace 1) to the combustion chamber 3. After the sensible heat of the stack gases has been utilised in the heat exchanger 4, the stack gases are passed through a washer 23, compressed by the induced-draft fan 5 and discharged into the atmosphere through the chimney 6.

Figure 4:
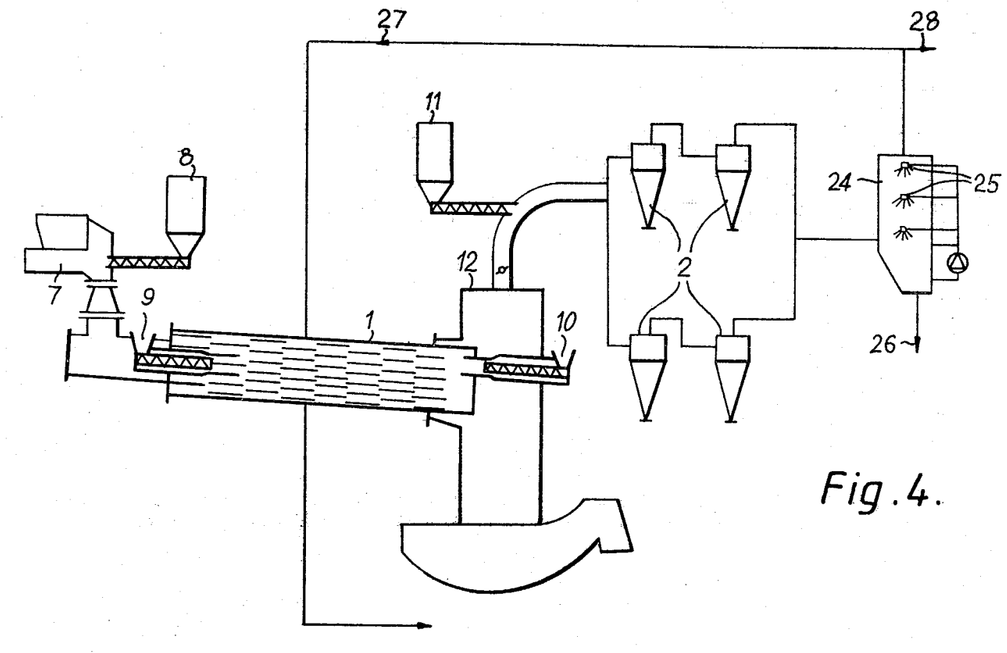

In the installation shown in FIG. 4, the pyrolysis gases issuing from the dust extractor 2 are subjected to oil-quenching in a unit 24. A continuously recycled oil is sprayed through nozzles 25 in the unit 24. The surplus oil formed is run off at 26. One portion 27 of the pyrolysis gases issuing from the unit 24 is used for indirectly heating the revolving tubular furnace 1 (the sensible heat of this gas stream may subsequently be further utilised), whilst another portion 28 may be put to another use.

Figure 5:
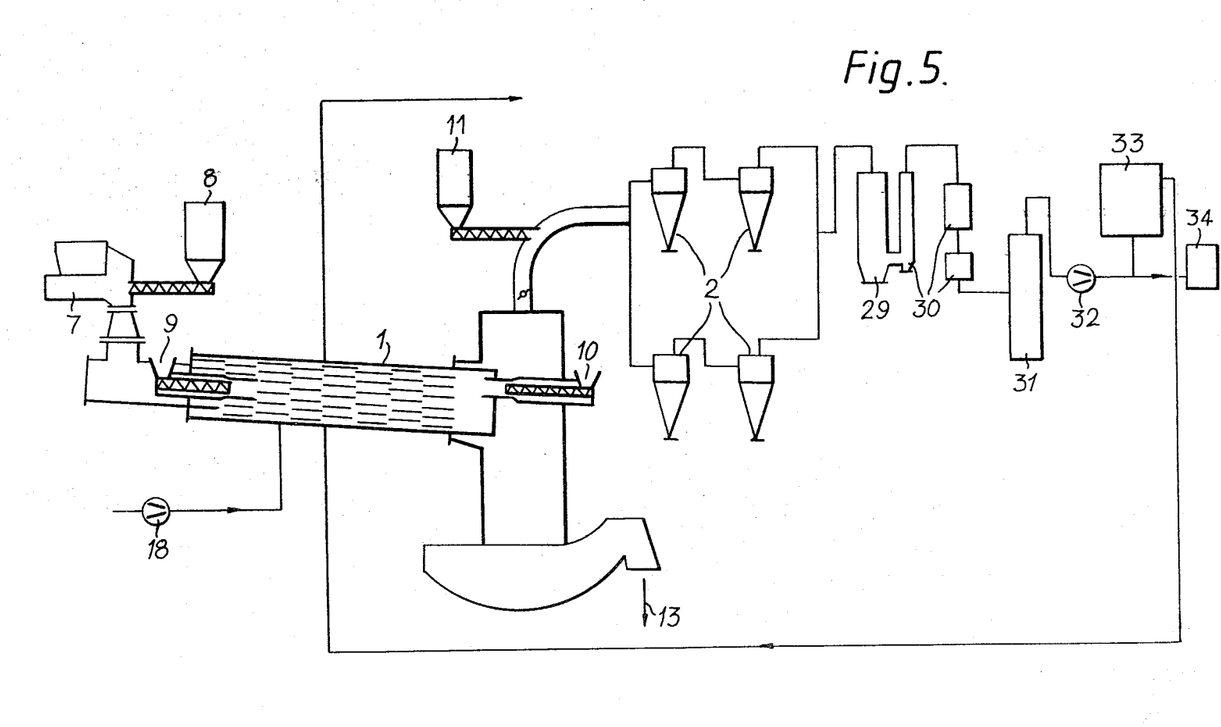

FIG. 5 shows an installation in which the pyrolysis gases issuing from the dust extractor 2 are delivered to a cracker 29 in which they are cracked at temperatures in the range from 1000° to 1200° C., i.e. are split into combustible gases. The combustible gases thus obtained are then passed through a multi-stage heat exchanger 30, a washer 31, an induced-draft fan 32 and a gas buffer 33 and may be used partly for heating the revolving tubular furnace 1 and partly for other energy generation (unit 34).

The invention is further described by the following Examples:

1. Pyrolysis of waste containing only chlorine

Test carried out using the installation shown in FIG. 1.

Composition of the waste: PVC and other plastics, paper and lacquer sludge
  Chloride content: %5=50 kg of Cl/t of waste
  Sulphur content: 0%
  Fluoride content: 0%
  Heavy metal content: 0%
  $Cl^-$-emission in the pyrolysis gas without the addition of lime: 32 kg of $Cl^-$/t of waste First Test Total amount of lime added 102 kg/t of waste: 80 kg through the feeder 8, 15 kg through the feeders 9 and 10 and 7 kg through the feeder 11.
Stoichiometric ratio (lime:chlorine in the waste) of 2:1.
Wall temperature of rotary furnace: 500° C.
Peripheral speed: 2.5 m/min.
$Cl^-$-emission in the pyrolysis gas: 2.2 kg of $Cl^-$/t of waste Second Test Total amount of lime added 102 kg/t of waste: solely through the feeder 8.
Wall temperature and peripheral speed of the revolving tubular furnace here and in all the following tests were the same as in the first test.
$Cl^-$-emission in the pyrolysis gas: 6.8 kg of $Cl^-$/t of waste Third Test Total amount of lime added 102 kg/t of waste: 80 kg through the feeder 8 and 22 kg through the feeders 9 and 10.
$Cl^-$-emission in the pyrolysis gas: 5.0 hg of $Cl^-$/t of waste Fourth Test Total amount of lime added 102 kg/t of waste: 90 kg through the feeder 8 and 12 kg through the feeder 11.
$Cl^-$-emission in the pyrolysis gas: 4.1 kg of $Cl^-$/t of waste Fifth Test Amount of lime added (through the feeders 9 and 10 only) 102 kg/t of waste.
$Cl^-$-emission in the pyrolysis gas: 5.5 kg of $Cl^-$/t of waste 2. Pyrolysis of waste containing only sulphur This test was carried out using an installation of the type shown in FIG. 4.
  Waste material: acid resins, paper, plastics, lacquer sludges
  Sulphur dioxide content: 5%=50 kg of $SO_2$/t of waste
  Chloride content: 0%
  Fluoride content: 0%
  Heavy metals Content: 0%
  $SO_2$-emission in the pyrolysis gas without the addition of lime: 44 kg of $SO_2$/t of waste
  Total amount of lime added 116 kg/t of waste: 90 kg through the feeder 8, 20 kg through the feeders 9 and 10 and 6 kg through the feeder 11.
  Stoichiometric ratio (lime:$SO_2$-content in the waste) 2:1
  Wall temperature of rotary furnace: 500° C.
  Peripheral speed of the furnace: 2.5 m/min.
  $SO_2$-emission in the pyrolysis gas with addition of lime: 0.9 kg of $SO_2$/t of waste 3. Pyrolysis of waste containing only fluorine This test was carried out using an installation of the type shown in FIG. 2.
  Waste material: Teflon, paper, plastics, lacquer sludges
  Fluorine content: 3%-30 kg of fluorine/t of waste
  Chloride content: 0%
  Sulphur content: 0%
  Heavy metal content: 0%
  $F^-$-emission in the pyrolysis gas without the addition of lime: 19 kg of $F^-$/t of waste
  Amount of lime added 111 kg/t of waste: 100 kg through the feeder 8, 7 kg through the feeders 9 and 10 and 4 kg through the feeder 11.
  Stoichiometric ratio (lime:fluorine content in the waste) 2:1
  Wall temperature of rotary furnace: 500° C.
  Peripheral speed of the furnace: 7.5 m/min.
  $F^-$-emission in the pyrolysis gas with addition of lime: 0.25 kg of $F^-$/t of waste 4. Pyrolysis of waste containing only heavy metals This test was carried out in an installation of the type shown in FIG. 4.
  Waste material: Clarified sludge containing heavy metals, paper, plastics, lacquer sludges
  Mercury content: 100 g/t of waste
  Cadmium content: 1000 g/t of waste
  Chromium content: 1500 g/t of waste
  Lead content: 1000 g/t of waste
  Chloride content: 0%
  Sulphur content: 0%
  Fluoride content: 0%
  Output of heavy metals in the pyrolysis gas without the addition of lime: 0%
  Heavy metals present as water-soluble compounds in the low-temperature coke eluate without the addition of lime:
  Cd 0.5 g/t, Cr 0.5 g/t, Pb 0.6 g/t, Hg 0.09 g/t of waste Addition of 10 kg of lime per t of waste through the feeder 8

Heavy metals present as water-soluble compounds in the low-temperature coke eluate with addition of lime:
Cd 0 g/t, Cr 0 g/t, Pb 0 g/t, Hg 0 g/t of waste
Furnace wall temperature: 500° C.
Peripheral speed of the furnace: 7.5 m/min.

5. Pyrolysis of waste containing halogen and sulphur

This test was carried out using an installation of the type shown in FIG. 2:
Waste material: PVC and other plastics, acid resins, paper and lacquer sludge
Chloride content: 3% (30 kg of Cl/t of waste)
Sulphur dioxide content: 3% (30 kg of $SO_2$/t of waste)
Fluorine content: 0%
$Cl^-$-emission in the pyrolysis gas without the addition of lime: 18.5 kg of $Cl^-$/t of waste
$SO_2$-emission in the pyrolysis gas without the addition of lime: 27.6 kg of $SO_2$/t of waste
Total amount of lime added 132 kg/t of waste: 105 kg through the feeder 8 and 27 kg though the feeders 9 and 10.
Stoichiometric ratio (lime:Cl- and $SO_2$-content in the waste) 2:1.
$Cl^-$-emission in the pyrolysis gas with addition of lime: 2.1 kg of $Cl^-$/t of waste
$SO_2$-emission in the pyrolysis gas with addition of lime: 0.4 kg of $SO_2$/t of waste
Furnace wall temperature: 500° C.
Peripheral speed: 7.5 meters/min.

6. Pyrolysis of waste containing heavy metals and sulphur

This test was carried out using an installation of the type shown in FIG. 4.
Waste material: Clarified sludge containing heavy metals, acid resins, paper, plastics and lacquer sludge
Mercury content: 100 g/t of waste
Cadmium content: 1000 g/t of waste
Chromium content: 1500 g/t of waste
Lead content: 1000 g/t of waste
Sulphur dioxide content: 2%=20 kg of $SO_2$/t of waste
Output of heavy metals in the pyrolysis gas without the addition of lime: 0%
Present as water-soluble compounds in low-temperature coke eluate:
Cd 0.6 g/t, Cr 0.5 g/t, Pb 0.7 g/t, Hg 0.06 g/t of waste
Emission of sulphur dioxide without the addition of lime: 17.5 kg of $SO_2$/t of waste
Quantity of lime added through the feeder 8: 70 kg/t of waste
Stoichiometric ratio (lime:$SO_2$-content in the waste) 3:1
Heavy metals present as water-soluble compounds in the low-temperature coke eluate with the addition of lime:
Cd 0 g/t, Cr 0 g/t, Pb 0 g/t, Hg 0 g/t of waste of waste
Emission of sulphur dioxide with the addition of lime: 0.5 kg/t of waste
Furnace wall temperature: 500° C.
Peripheral speed of the revolving tubular furnace: 7.5 m/min.

7. Pyrolysis of waste containing chlorine, fluorine, sulphur and heavy metals

This test was carried out using an installation of the kind shown in FIG. 1.
Waste material: PVC, Teflon and other plastics, acid resins, clarified sludges containing heavy metals, paper, lacquer sludges
Chloride content: 2% (20 kg of $Cl^-$/t of waste)
Fluoride content: 1% (10 kg of $F^-$/t of waste)
Sulphur dioxide content: 2% (20 kg of $SO_2$/t of waste)
Heavy metals content:
Mercury: 200 g/t of waste
Cadmium: 1000 g/t of waste
Chromium: 1500 g/t of waste
Lead: 1000 g/t of waste
Output of $Cl^-$ in the low-temperature carbonization gas without the addition of lime: 13.4 kg of $Cl^-$/t of waste
Output of $F^-$ in the low-temperature carbonization gas without the addition of lime: 6 kg of $F^-$/t of waste
Output of $SO_2$ in the low-temperature carbonization gas without the addition of lime: 17.9 kg of $SO_2$/t of waste
Output of heavy metals in the low-temperature carbonization gas without the addition of lime: total 0 kg
Output of heavy metals in the low-temperature coke eluate without the addition of lime:
Cd 0.4 g/t, Cr—Pb 0.2 g/t, Hg 0.03 g/t of waste
Amount of lime added through the feeder 8 125 kg of lime/t of waste
Stoichiometric ratio (lime:Cl-, $SO_2$-, F-content in the waste)2:1
Output of $Cl^-$ in the low-temperature carbonization gas with the addition of lime: 1.1 kg of $Cl^-$/t of waste
Output of $F^-$ in the low-temperature carbonization gas with the addition of lime: 0.05 kg of $F^-$/t of waste
Output of $SO_2$ in the low-temperature carbonization gas with the addition of lime: 0.9 kg of $SO_2$/t of waste
Output of heavy metals in the low-temperature coke eluate with the addition of lime:
Cd 0 g/t of waste, Cr 0 g/t of waste, Pb 0 g/t of waste, Hg 0 g/t of waste
Furnace wall temperature: 500° C.
Peripheral speed of the revolving tubular furnace: 7.5 m/min.

8. Pyrolysis of waste containing chloride and sulphur for producing a pyrolysis oil substantially free from pollutants This test was carried out using an installation of the type shown in FIG. 4.
Waste material: PVC and other plastics, acid resins, paper, lacquer sludges
Chloride content: 3% (30 kg/t of waste)
Sulphur dioxide content: 3% (30 kg/t of waste)
Amount of pyrolysis oil 95 kg/t of refuse
Pyrolysis without the addition of lime:
Chloride content of pyrolysis oil: 200 mg/kg of pyrolysis oil Sulphur dioxide content of pyrolysis oil: 280 mg/kg of pyrolysis oil
Addition of lime, 132 kg/t of refuse: 100 kg through the feeder 8, 20 kg through the feeders 9 and 10 and 12 kg through the feeder 11.
Stoichiometric ratio (lime:Cl- and $SO_2$-content) 3:1
Chloride content of the pyrolysis oil with the addition of lime: 11 mg/kg of oil
Sulphur dioxide content of the pyrolysis oil with the addition of lime: 1.2 mg/kg of oil
Furnace wall temperature: 500° C.
Peripheral speed of the revolving tubular kiln: 7.5 m/min.

9. Pyrolysis of domestic refuse

These tests were carried out in an installation of the type shown in FIG. 1. The type and quantity of basic materials added and the rotational speed of the furnace were varied. The results are set out in the following Table:

|  | Base = calcium hydroxide | | | | Base = calcium oxide | | |
|---|---|---|---|---|---|---|---|
| Grams of base added per t of refuse | 0 | 4500 | 9000 | 18000 | 4500 | 9000 | 9000 |
| Furnace wall temperature (°C.) | 500 | 500 | 500 | 500 | 500 | 500 | 500 |
| Peripheral speed of furnace (m) | 4 | 4 | 4 | 4 | 8 | 8 | 8 |
| Emission of chloride in pyrolysis gas, (g/t of refuse) | 2608 | 290 | 131 | 44 | 150 | 268 | 46 |
| Emission of fluoride in pyrolysis gas, (g/t of refuse) | 7 | 0.15 | 0.1 | 0.1 | 0.1 | — | — |
| Emission of sulphur (as $SO_2$) in pyrolysis gas, (g/t of refuse) | 43 | 0.9 | 0.6 | — | — | — | — |
| TOC (total organic carbon) value of the LTC* eluate (mg/t of refuse) | 340 | 55 | 45 | 50 | 65 | 70 | 920 |
| Dust emission in pyrolysis gas (g/t of refuse) | 4250 | 80 | 85 | 66 | 90 | 40 | 51 |
| Loose weight of the LTC* g/cc. | 0.6 | 0.75 | 0.8 | 1.0 | 0.95 | 1.0 | 0.95 |
| Ignition residue of the LTC* in % | 22 | 17 | 11 | 8 | 10 | 12 | 9 |

*LTC = Low-Temperature-Coke

What is claimed is:

1. A method of suppressing the emission of halogens and sulfur dioxide and the formation of water-soluble compounds of heavy metals in the pyrolysis of carbonaceous waste in an indirectly heated revolving tubular furnace at temperatures in the range from 300° to 600° C. to form low-temperature coke, wherein the improvement comprises the steps of (a) adding a first quantity of a fine-grained basic material to the waste prior to completion of the pyrolysis of the waste in the revolving tubular furnace, (b) mixing the pyrolysis gases leaving the revolving tubular furnace with a second quantity of fine-grained basic material, and (c) passing the gases through a dust extractor, whereby a dense, compact low-temperature coke having reduced dust content is produced.

2. A method as claimed in claim 1 wherein the amount of fine-grained basic material added prior to completion of the pyrolysis of the waste is from 1.5 to 19 times the amount of such material which is mixed with the pyrolysis gases.

3. A method as claimed in claim 1 wherein most of the fine-grained basic material used is added to the waste before it enters the revolving tubular furnace.

4. A method as claimed in claim 1 wherein a fine-grained basic material is added to the waste during the pyrolysis, by introducing it pneumatically into the revolving tubular furnace by means of an inert gas.

5. A method as claimed in claim 4 wherein fine-grained basic material is pneumatically introduced into both ends of the revolving tubular furnace.

6. A method as claimed in claim 1 wherein the total amount of fine-grained basic material used is in excess of the stoichiometric equivalent of the halogen and sulfur content of the waste.

7. A method as claimed in claim 1 wherein the fine-grained basic material is of the class consisting of calcium hydroxide, calcium carbonate, dolomite, magnesium carbonate and calcium oxide.

8. A method as claimed in claim 1 wherein the residence time of the waste in the revolving tubular furnace is from 20 to 90 minutes.

9. A method as claimed in claim 1 wherein the grain size of the basic material on addition is less than 1 mm.

10. A method as claimed in claim 1 wherein gases produced by the pyrolysis are delivered directly without dust extraction from the revolving tubular furnace to a combustion chamber.

11. A method as claimed in claim 1 wherein gases produced by the pyrolysis are burned in a combustion chamber to form stack gases, and the stack gases are used for indirectly heating the revolving tubular furnace.

12. A method as claimed in claim 11 wherein a portion of the stack gases used for indirectly heating the revolving tubular furnace is returned to the combustion chamber to regulate the temperature therein.

13. A method as claimed in claim 1 wherein the sensible heat of a portion of the gases produced by the pyrolysis is used for indirectly heating the revolving tubular furnace and a portion of such gases is burned.

14. A method as claimed in claim 1 wherein gases produced by the pyrolysis are cracked in a cracking zone at temperatures in the range from 1000° to 1200° C.

15. A method as claimed in claim 1 wherein the tubular furnace revolves at a peripheral speed between 3 and 50 m./min.

16. A method as claimed in claim 1 wherein the revolving tubular furnace has lifter-like fittings.

* * * * *